Nov. 20, 1923.
F. URBAN
1,474,743
FOUR-LENS OBJECTIVE
Filed March 9, 1922
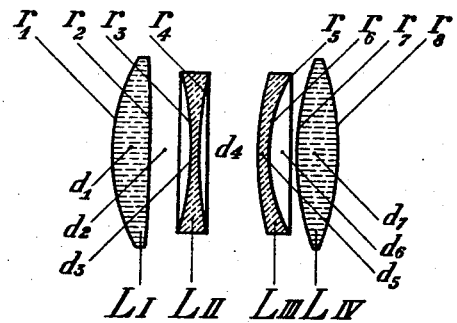
Inventor:
Franz Urban
by
Leo J. Matty
Atty.

Patented Nov. 20, 1923.

1,474,743

UNITED STATES PATENT OFFICE.

FRANZ URBAN, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

FOUR-LENS OBJECTIVE.

Application filed March 9, 1922. Serial No. 542,227.

*To all whom it may concern:*

Be it known that I, FRANZ URBAN, a citizen of the German Republic, residing at Steglitz, near Berlin, Germany, have invented certain new and useful Improvements in Four-Lens Objectives (for which I have filed patent application in Germany March 8th, 1921), of which the following is a specification.

My present invention for which till now I have filed patent applications only in Germany on March 8th, 1921, relates to improvements in spherically, chromatically, astigmatically and comatically corrected objectives built up of four lenses of which the two outer ones are bi-convex and formed of highly refractive baryta-crown glass and the two inner ones negative lenses of higher dispersive property than the biconvex lenses. The purpose of the invention is to provide an objective built up of four lenses as above indicated which is distinguished by great luminosity and by a very satisfactory correction of the astigmatic aberration of the image produced thereby. To this end in the new objective according to the invention one of the two negative lenses of the system is made biconvex and the other convex concave and positioned so as to turn its convex surface towards the biconcave lens, so that an air space of meniscus shape is formed between said two lenses, such air meniscus preferably having the form of a negative lens.

In this new objective construction the high dispersive property of the biconvex lenses is of decisive character for the effect aimed at. In view of the fact that a somewhat lower dispersive property of the one concave inner lens can be compensated by a somewhat higher dispersive property of the other concave inner lens the effect depends thereon that the sum of the dispersive powers of the glasses for the two lenses is not less than a certain value. Although this value is not positively fixed and may be varied it can be said that it should not be less than 0.04, it being understood that the value here mentioned is equal to the sum of the differences of the refractive indices for the lines G' and D of the spectrum in both said concave inner lenses. If for instance in the example which will be given later on the indices of refraction $n_G$, and $n_D$ are respectively 1.6761 and 1.6504 and if these indices are the same for both said lenses then the sum here in question is 0.0514.

An embodiment of the new objective is illustrated on the accompanying drawing in axial section. The lenses are designated $L_I$, $L_{II}$, $L_{III}$, $L_{IV}$, the lens $L_I$ being that which is situated on the light entrance side. The radii of curvature of the surfaces of the lenses are designated $r_1$ to $r_8$ and the thicknesses of the lenses and those of the air spaces between the lenses are designated $d_1$ to $d_7$. The values of the radii of curvature $r_1$ to $r_8$ and those of $d_1$ to $d_7$ and furthermore the values of the indices of refraction $n_D$ and $n_G'$ for the D line and G line of the spectrum for each of the lenses $L_I$ to $L_{IV}$ are given in the following table for an objective in accordance with the invention having a focal length equal to 150 mm. and a ratio of aperture equal to 1:2.

| | | | | |
|---|---|---|---|---|
| $r_1=+\ 74,2$ | | | | |
| | $d_1=14,7$ | $L_I$ | $n_D=1,6216$ | $n_G'=1,6352$ |
| $r_2=-533,4$ | | | | |
| | $d_2=16,5$ | | | |
| $r_3=-118,2$ | | | | |
| | $d_3=\ 4,5$ | $L_{II}$ | $n_D=1,6504$ | $n_G'=1,6761$ |
| $r_4=+200,0$ | | | | |
| | $d_4=23,1$ | | | |
| $r_5=+140,8$ | | | | |
| | $d_5=\ 5,1$ | $L_{III}$ | $n_D=1,6504$ | $n_G'=1,6761$ |
| $r_6=+\ 63,2$ | | | | |
| | $d_6=10,5$ | | | |
| $r_7=+103,9$ | | | | |
| | $d_7=16,8$ | $L_{IV}$ | $n_D=1,6230$ | $n_G'=1,6366$ |
| $r_8=-114,6$ | | | | |

What I claim is:—

1. A spherically, chromatically, astigmatically and comatically corrected objective built up of two outer biconvex lenses made of highly refractive baryta-crown glass and two concave inner lenses, one of said concave inner lenses being biconcave and the other convex concave, the latter turning its convex surface towards the biconcave lens, both said concave inner lenses having substantially higher dispersive property than the two outer biconvex lenses, the dispersive properties of the inner lenses being such that the total of the differences of the indices of refraction $n_G$, and $n_D$ for the lines G' and D of the spectrum for both said lenses is not less than 0.04.

2. A spherically, chromatically, astigmatically and comatically corrected objective built up of two outer biconvex lenses made of highly refractive baryta-crown glass and two concave inner lenses, one of said concave inner lenses being biconcave and the other convex concave, the latter turning its convex surface towards the biconcave lens, and having such curvature that an air meniscus in the form of a negative lens is formed between said two concave inner lenses both of them having substantially higher dispersive property than the two outer biconvex lenses, the dispersive properties of the inner lenses being such that the total of the differences of the indices of refraction $n_G$, and $n_D$ for the lines G' and D of the spectrum for both said lenses is not less than 0.04.

In testimony whereof I have signed this specification in the presence of two subscribing witnesses.

FRANZ URBAN.

Witnesses:
E. HOLTZERMAN,
R. OTTKER.